(12) United States Patent
Simmons

(10) Patent No.: US 11,369,911 B2
(45) Date of Patent: Jun. 28, 2022

(54) PULLEY MOUNT FILTER WITH VERTICAL CHANNEL SUPPORT

(71) Applicant: The Newway Company, Commerce Township, MI (US)

(72) Inventor: Randy Simmons, West Chester, OH (US)

(73) Assignee: The Newway Company, West Chester, OH (US)

( * ) Notice: Subject to any disclaimer, the term of this patent is extended or adjusted under 35 U.S.C. 154(b) by 361 days.

(21) Appl. No.: 16/741,788

(22) Filed: Jan. 14, 2020

(65) Prior Publication Data

US 2020/0222845 A1 Jul. 16, 2020

Related U.S. Application Data

(60) Provisional application No. 62/793,097, filed on Jan. 16, 2019.

(51) Int. Cl.
| | | |
|---|---|---|
| *B01D 46/00* | (2022.01) | |
| *B01D 46/18* | (2006.01) | |
| *E05D 15/24* | (2006.01) | |

(52) U.S. Cl.
CPC ....... *B01D 46/185* (2013.01); *B01D 46/0005* (2013.01); *E05D 15/246* (2013.01)

(58) Field of Classification Search
CPC ............ B01D 46/0002; B01D 46/0004; B01D 46/0005; B01D 46/10; B01D 46/20; B01D 46/88; B01D 46/185; B01D 46/521; E05D 15/246
USPC .................................. 55/494, 495, 497, 501
See application file for complete search history.

(56) References Cited

U.S. PATENT DOCUMENTS

| | | |
|---|---|---|
| 1,851,901 A | 3/1932 | Gran |
| 4,027,498 A | 6/1977 | Fessler |
| 4,328,676 A | 5/1982 | Reed |
| 4,392,360 A | 7/1983 | Gidge et al. |
| 4,412,791 A | 11/1983 | Lal |
| 4,429,548 A | 2/1984 | Layne |
| 4,465,499 A | 8/1984 | Wawro et al. |
| 4,745,769 A | 5/1988 | Wooden, Jr. |
| 4,807,444 A | 2/1989 | Aoki et al. |
| 4,926,081 A | 5/1990 | DiFlora et al. |
| 4,991,406 A | 2/1991 | Fujii et al. |
| 5,131,463 A | 7/1992 | Zimmerli et al. |
| 5,141,046 A | 8/1992 | Duncan |
| 5,156,662 A | 10/1992 | Downing et al. |
| 5,370,722 A | 12/1994 | Simmons |

(Continued)

*Primary Examiner* — Minh Chau T Pham
(74) *Attorney, Agent, or Firm* — Dinsmore & Shohl LLP

(57) ABSTRACT

A filter mounting assembly for use with a structure having front and interconnecting side faces surrounding an air intake opening. The assembly includes at least one "L" shaped member adapted to be secured to either of the front or side faces of the structure on either side of the intake opening. A track is secured to each of the members so that an interior accessible channel of each track is arrayed in opposing fashion on opposite sides of the opening forward of the front intake face. A plurality of rollers are contained within each of the rails, the rollers each further including a forward extending hook portion projection from the interior track channels. A covering is provided having a plurality of side edge proximate located eyelets, the hook portions engaging through the eyelets for supporting the covering over the opening.

20 Claims, 7 Drawing Sheets

(56) References Cited

U.S. PATENT DOCUMENTS

| | | | | |
|---|---|---|---|---|
| 5,399,180 | A | 3/1995 | Kopp | |
| 5,529,593 | A | 6/1996 | Simmons | |
| 5,532,663 | A | 7/1996 | Herd et al. | |
| 5,809,800 | A | 9/1998 | Deal | |
| 5,915,283 | A | 6/1999 | Reed et al. | |
| 5,964,910 | A | 10/1999 | Keele | |
| 6,138,993 | A | 10/2000 | Mitchell, Jr. et al. | |
| 6,152,998 | A | 11/2000 | Taylor | |
| 6,197,077 | B1 | 3/2001 | Simmons et al. | |
| 6,264,713 | B1 | 7/2001 | Lewis, II | |
| 6,279,335 | B1 | 8/2001 | Jacobs | |
| 6,334,881 | B1 | 1/2002 | Giannetta et al. | |
| 6,406,508 | B1 | 6/2002 | Bloomer | |
| 6,430,954 | B1 | 8/2002 | Smith | |
| 6,623,540 | B2 | 9/2003 | Clayton et al. | |
| 6,632,269 | B1 * | 10/2003 | Najm | B01D 46/20 55/501 |
| 6,796,359 | B1 | 9/2004 | Knutson | |
| 6,814,660 | B1 | 11/2004 | Cavett | |
| 6,912,766 | B2 | 7/2005 | Wendt et al. | |
| 6,918,940 | B1 | 7/2005 | Lackey et al. | |
| 6,974,622 | B2 | 12/2005 | Wade | |
| 6,993,927 | B2 | 2/2006 | Austen et al. | |
| 7,043,935 | B2 | 5/2006 | Hunter | |
| 7,323,028 | B2 | 1/2008 | Simmons | |
| 7,387,654 | B1 | 6/2008 | Byers | |
| 7,416,577 | B2 | 8/2008 | Simmons | |
| 7,604,127 | B2 | 10/2009 | Freissle et al. | |
| 7,842,116 | B2 | 11/2010 | Simmons | |
| 7,896,941 | B2 | 3/2011 | Choi | |
| 8,172,919 | B1 * | 5/2012 | Ruiz | B01D 46/0002 55/315 |
| 8,726,954 | B2 | 5/2014 | Simmons | |
| 8,784,528 | B2 * | 7/2014 | Gorman | B01D 46/10 55/497 |
| 8,801,824 | B2 | 8/2014 | Whittemore | |
| 9,375,669 | B2 | 6/2016 | Spiegel | |
| 2004/0069703 | A1 | 4/2004 | Wanni et al. | |
| 2004/0129139 | A1 | 7/2004 | Schumacher | |
| 2005/0098080 | A1 | 5/2005 | Pritchett | |
| 2005/0279063 | A1 | 12/2005 | Simmons | |
| 2005/0279064 | A1 * | 12/2005 | Simmons | F28F 19/01 55/495 |
| 2005/0279065 | A1 | 12/2005 | Simmons | |
| 2006/0037296 | A1 * | 2/2006 | Duffy | B01D 46/521 55/495 |
| 2006/0107637 | A1 * | 5/2006 | Caesar | B01D 46/0002 55/495 |
| 2006/0260284 | A1 * | 11/2006 | Masciotra | B01D 46/88 55/495 |
| 2007/0199289 | A1 * | 8/2007 | Bland, Jr. | B01D 46/10 55/495 |
| 2007/0204575 | A1 * | 9/2007 | Lisbona | B01D 46/0004 55/495 |
| 2007/0204945 | A1 | 9/2007 | Ross | |
| 2009/0014371 | A1 | 1/2009 | Cook | |
| 2012/0317938 | A1 * | 12/2012 | Sullivan | B01D 46/521 55/354 |

\* cited by examiner

PULLEY MOUNT FILTER WITH VERTICAL CHANNEL SUPPORT

CROSS REFERENCE TO RELATED APPLICATIONS

The present application claims the priority of U.S. Ser. No. 62/793,097 filed Jan. 16, 2019.

FIELD OF THE INVENTION

The present invention relates generally to a filter mount assembly supporting a filter screen assembly over an opening of an air intake. More particularly, the present invention teaches a filter mount assembly with variants of rail and bracket mount configurations for securing elongated "C" shaped channels to both of front and side facing vertical support surfaces associated with the intake face, such as which can be associated with any structure not limited to an evaporative cooling tower, air handling unit or the like. The associated screen or covering can also be stiffened or reinforced along at least its vertically extending edges, this reducing the required degree of mechanical control along the filter edges. Any of a rope and pulley combined with roller hooks and track, in either of powered or manual versions, can be utilized for traversing the filter across the intake opening (including in up/down directions however also contemplating advancing in a cross direction). When the filter is in the down and idle position a series of attached or unattached bundle type straps can be provided and are wrapped around the filter to protect it from outdoor elements during periods of non use (off-season). Advantages of the present design include eliminating the use of integrated storage units, as well as cables, springs, I-bolts, J-bolts, and cable clamps typical of prior art filter mount assemblies, and in order to provide for less drilling of the intake face with reduced installation time.

BACKGROUND OF THE INVENTION

The prior art is documented with examples of filter mount assemblies, such as associated with an air handling unit. A first example of this is depicted in the covering of Simmons U.S. Pat. No. 8,726,954. The embodiment of FIG. 16 in particular describes a horizontal and modified "U" shaped extending track which contain a plurality of spindle shaped and traversable rollers with downwardly extending hooks (at 96) for extending an impermeable layer across the unit opening. As further shown, each downwardly extending hook passes through a lower clearance slot or channel defined between the roller supporting sides of the track, the hooks engaging selected eyelets associated with an impermeable layer, shown at 100 and including an outer reinforcing hem or perimeter 102, in a generally curtain supporting and translating fashion across the unit opening.

SUMMARY OF THE PRESENT INVENTION

The present invention discloses a filter mounting assembly for use with a structure, the structure having front and interconnecting side faces surrounding an air intake opening. The assembly includes at least one "L" shaped bracket or like member adapted to be secured to either of the front or side faces of the structure on either side of the intake opening. A track is secured to each of the members so that an interior accessible channel of each track is arrayed in opposing fashion on opposite sides of the opening forward of the front intake face.

A plurality of rollers are contained within each of the rails, the rollers each further including a forward extending hook portion projection from the interior track channels. A covering is provided having a plurality of side edge proximate located eyelets, the hook portions engaging through the eyelets for supporting the covering over the opening.

Additional features include the at least one "L" shaped member further provided as a plurality of "L" shaped members or brackets vertically spaced along opposite sides of the intake structure and which can be configured as elongated rails. The "L" shaped members can also further include pairs of overlapping "L" shaped brackets adapted to secure to the sides of the intake unit. The assembly can also include slots configured into each of first and second sides of each of said "L" shaped member, fasteners mounting through said slots for securing said members at first ends to the intake structure and at second ends to said rails for bi-axially adjusting said rails relative to the intake structure.

The covering can, without limitation, include a vinyl material and may also include reinforced side edging integrating the eyelets. Pulleys can also be mounted to the structure above the intake opening, a line extending through the pulleys from a user accessible location and engaging upper edge locations of the covering. Other features include sleeves configured into top and bottom extending edges of the covering and receiving a reinforcing conduit.

Yet additional features include eye-bolts attached to the top edge extending conduit, or, related top edge fastening points for attachment of the lines to the top edge of the filter/covering. Bundle straps may extend from the bottom edge extending conduit.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached figures, the present invention discloses a filter mount assembly for supporting a filter screen over an opening of an air intake, and further disclosing variants of rail and bracket mount configurations for securing elongated (such as "C" or "U" shaped) tracks defining receiving channels, and which are secured to either of front and side facing support surfaces associated with the intake face and structure, such as which can be associated with an evaporative cooling tower or air handling unit. As will also be described, the associated screen or like covering can also be stiffened or reinforced along at least its vertically extending edges for increasing mechanical control and filter media tautness required to be exerted along the filter edges for advancing/retracting the screen or maintaining the same in position over the intake face opening.

Figure 1:
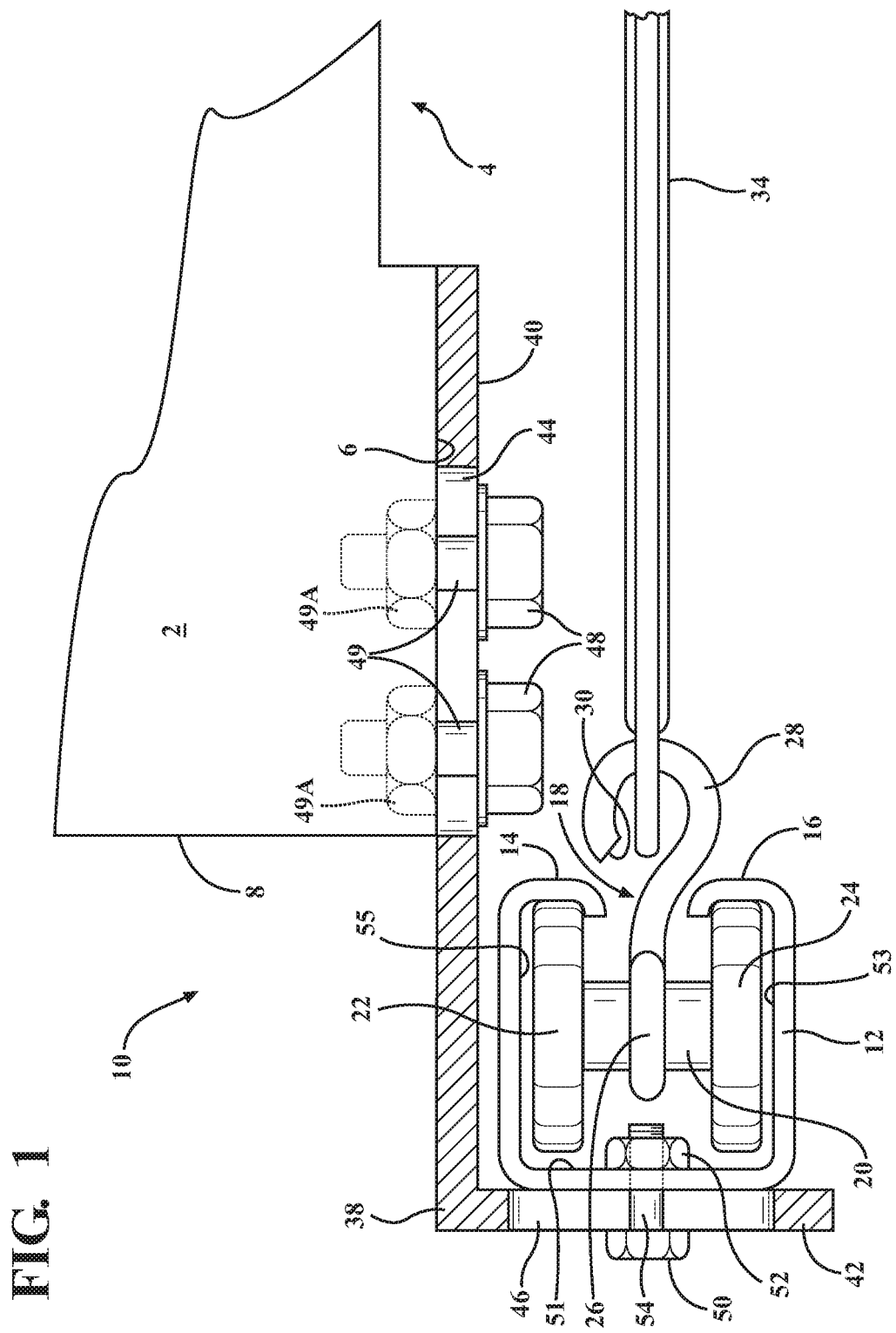
FIG. 1 is a partial overhead illustration of a mounting configuration according to a first embodiment in which the roller and hook supporting channel tracks are each secured via an "L" shaped bracket to the front face of the air intake structure in proximity to a central opening over which the supported filter or covering extends.
Figure 2:
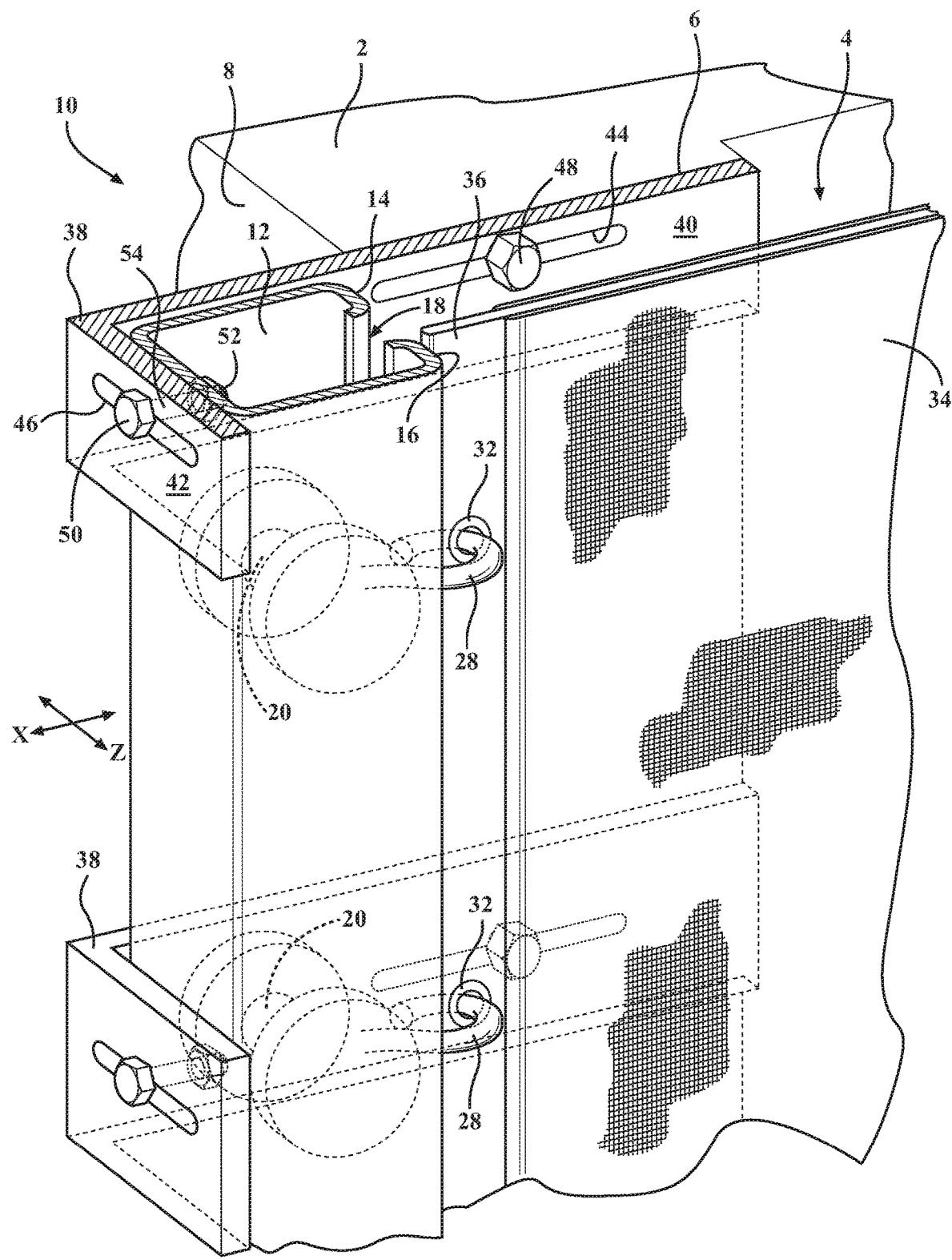
FIG. 2 is a perspective view of the variant of FIG. 1 and depicting a pair of vertically spaced apart and horizontally secured brackets for supporting a vertically extending channel track, each of the "L" support brackets further including a first adjustment slot configured through a first leg for laterally adjusting the bracket relative to the mounting location of the forward intake face, along with a second adjustment slot on a second leg configured through a second shorter and interconnected bracket leg for adjusting the channel track in/out (fore and aft) from the front intake face.

With reference initially to FIGS. 1 and 2 viewed in combination, generally illustrated at 10 is a mounting configuration according to a first embodiment for securing at least a pair of vertically extending channel defining tracks or rails, one of which is depicted at 12, to either of front 6 or side 8 facing surfaces of an air intake structure 2, further depicted at 2 and including a central opening (generally represented at 4).

As further shown, the channel tracks 12 (only one of which is again depicted in vertically extending fashion in each of FIGS. 1-6) can be constructed of any of a steel or other suitable material construction (such as which is envisioned to also include any of aluminum, durable plastics, plastic composites) and the like. The channel tracks, as further depicted in cross section, further include three interconnected closed surfaces joined by a partial fourth outwardly facing surface defined by inwardly turned edges 14 and 16, between which is spaced an axial (vertical) extending middle channel, further referenced generally at 18. Upon being mounted, the tracks 12 are arranged so that their inwardly accessible channels are arrayed in opposing fashion on opposite sides of the intake opening 4.

A plurality of roller attachment components are depicted in each of FIGS. 1-6 and 7A, supported in easily traversable fashion within the confining interior of the channel tracks 12. As best shown in each of FIGS. 1 and 4, each of the roller components includes a common hub 20 which rotatably supports a pair of wheels 22 and 24 in the non-limiting illustrated embodiment. As further best shown in FIG. 1, the dimensions of the wheels 22/24 are such that they provide a limited degree of axial movement within the defined cross sectional interior of the channel lock, this in order to facilitate ease of traversing the covering up/down and without initiating friction or jamming of the rollers within the channels.

A configuration of a "J" hook is further shown which includes a central support location 26 attached to the hub 20, with an integral portion 28 extending outwardly through the axial central channel 18 defined in the fourth open side of the channel track 12, the extending portion 28 extending in a curved fashion and terminating at a reverse bent end 30 which defines a sufficient gap with an intermediate location of the extending portion 28 in order for the "J" hook to engage the filter or intake opening though edge proximate extending eyelets 32 configured into a covering 34. Without limitation, the "J" configuration 28 depicted in reference to the roller can be substituted by any other shaped portion for securing to the covering or screen eyelet and which is not limited to that shown.

Without limitation, the covering 34 can include any of a filter screen, mesh or other semi-permeable or impermeable covering. A rigid edging material or sewn sleeve is provided to accommodate insertion of a ridged component (such including but not limited to any of a metal conduit, pipe, plastic or fiberglass stiffener), with reference further at 36 in each of FIGS. 2, 3, 5, and 6. The cover 34 further can integrate the eyelets 32 being sewn with or otherwise affixed to the extending horizontal edges (top and bottom) of the screen or covering 34. In this manner, the screen or other associated permeable or impermeable covering exhibits additional rigidity along the horizontal edges which translates into less required mechanical control along the filter edges for advancing/retracting the cover or simply maintaining in a deployed position across the intake face opening.

As further shown in FIGS. 1-2, the roller and hook supporting channel tracks 12 are each secured, via "L" shaped support brackets 38, to the front face 6 of the air intake structure 2 in proximity to a central opening 4 and over which the supported filter or covering 34 is extended. As will be further described in the related variant of FIGS. 4-6, the alternate embodiment further discloses securing the "L" brackets to the side faces, at 8, of the intake structure 2, and as opposed to its front face 6.

The "L" shaped bracket 38 of the first variant can be provided as a piece of elongated steel or other durable shaped item having a first main extending side 40 and a second shorter side 42. As additionally depicted in FIG. 2, a perspective view of the variant of FIG. 1 is additionally shown and depicting a pair of vertically spaced apart and horizontally secured brackets 38 for supporting the vertically extending channel track 12.

Each of the "L" support brackets further includes a first adjustment slot 44 configured through the first leg 40. A second adjustment slot 46 is configured through the second shorter and interconnected bracket leg 42. A pair of bolt and nut fastener arrangements are illustrated, each with an enlarged head 48 and extending shaft portion 49 is provided for engaging through the first slot 44 and within the forward intake face 6, the underside of the head 48 biasing against the edges of the first leg 40 adjoining the slot 44 for permitting lateral adjustment of the bracket 38 relative to the mounting location of the intake face 6.

The shaft portion 49 can anchor directly into the air intake front surface 6 (assuming it is of sufficient thickness for structurally supporting the "L" bracket). Alternatively, and in the instance of the intake front face having a determined thickness requiring backing support, nuts 49A (see again FIG. 1) can engage over the ends of the shaft portions 49 in order support the bracket and to prevent it from twisting.

A second adjustment bolt (depicted as a bolt arrangement and nut 50 and 52 with inter-extending threaded shaft 54) extends through the second slot 46 and an aligning aperture defined in the base wall of the channel lock 12 for both anchoring and providing a range of adjustment of the channel track in/out (fore and aft) from the front intake face an in order to permit bi-axial adjustment of the channel lock 12 about lateral axis "x" and depth defining axis "z" as shown in FIG. 2. It is also understood that the invention contemplates the use of a pair of bolts or a single bolt in combination with an inserting dimple or carriage bolt for each slotted area to prevent the bracket 38 from twisting about a single installed bolt.

Figure 3:
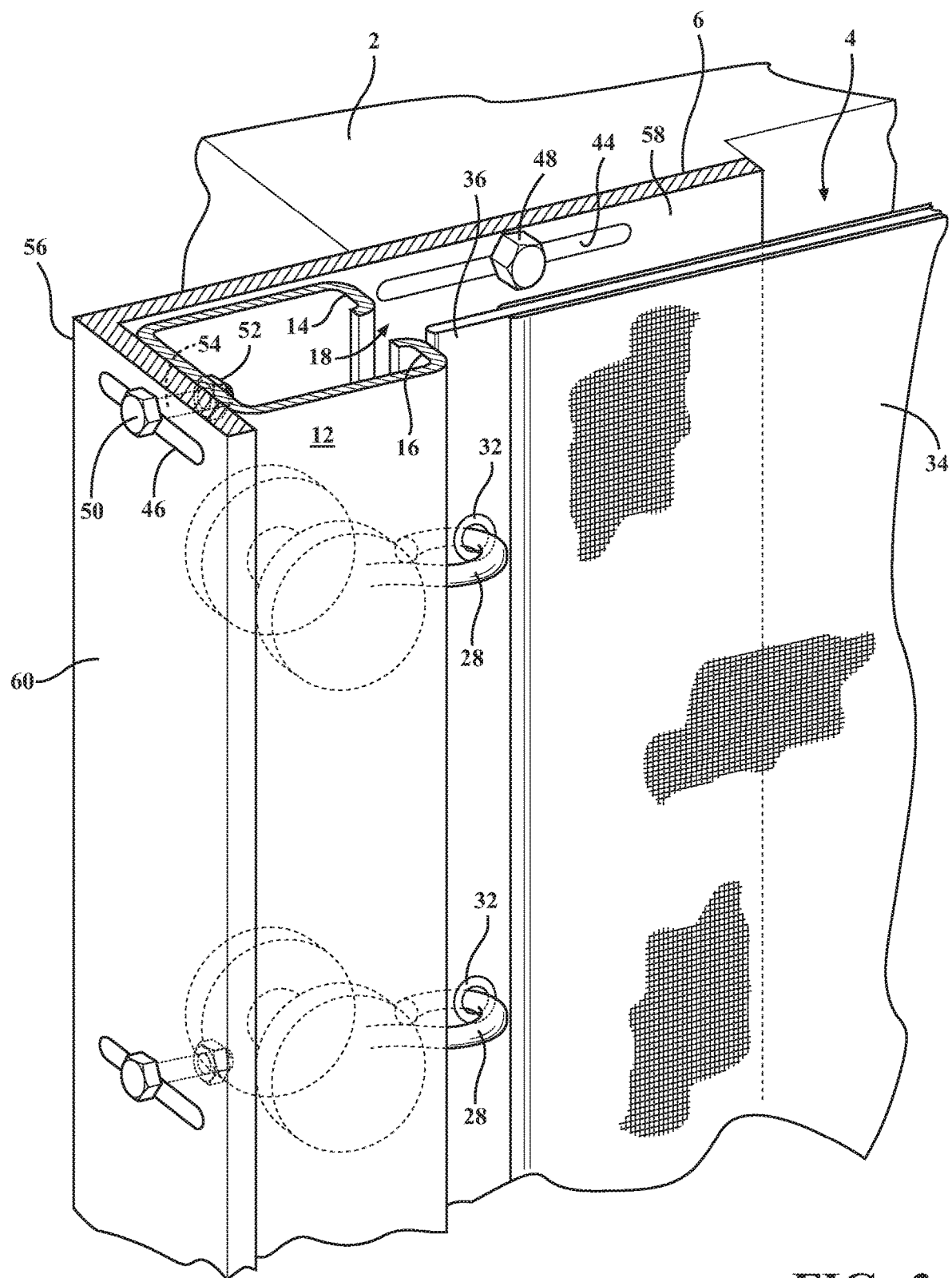
FIG. 3 is an illustration similar to FIG. 2 and depicting a continuous elongated and depth extending and "L" cross sectional shaped rail mounted to the forward intake face in substitution for the "L" bracket.

FIG. 3 is an illustration similar to FIG. 2 and depicting the provisional of a continuous depth extending and elongated "L" cross sectional shaped rail 56 mounted to the forward intake face in substitution of the "L" bracelet arrangement of FIGS. 1-2. As with the individual brackets 38, the rail 56 also includes a first main extending side 58 overlaying the front intake face 6 with an interconnected and outwardly angled end side 60 extending similarly to that depicted for the shorter second side 42 of the "L" brackets 38 in FIGS. 1-2.

The arrangement of first 44 and second adjustment slots 46 is provided with associated bolts (single headed 48 with threaded shaft and nut 49) and (nut and bolt 50/52 with inter extending threaded shaft 54) for providing similar adjustability both laterally (along slot 44) and in/out (along slot 46) of the vertically mounted channel lock 12. Without limitation, any style of bracket not limited to that depicted herein can be used to attach the vertical channel or track 12, and which can include attaching the bottom of the track (shown at 55 in FIG. 1) to the bracket by drilling a hole from either of opposing side walls (at 53 and 55) of the track straight through the other track sidewall. A bolt may be inserted through the track and into the slot where a lock nut secures it on the back side of the bracket. The bracket can be made out of a metal or any suitable material able to support the track and filter system on an air intake opening.

In operation, traversing of the screen/covering 34 across the intake opening 4 can be accomplished by any arrangement of cables/pulleys, as will be further described with reference to FIG. 7. Alternatively, it is envisioned that an electric motor or other powered input can be integrated into the assembly for efficiently raising and lowering the screen, via the opposite side extending rollers and J-hooks. To this end, the top edge of the covering can also include any of an additional stiffened edge or multiple engagement points to prevent horizontal edges from collapsing and being drawn inward under flow of air and to facilitate traversing.

Figure 4:
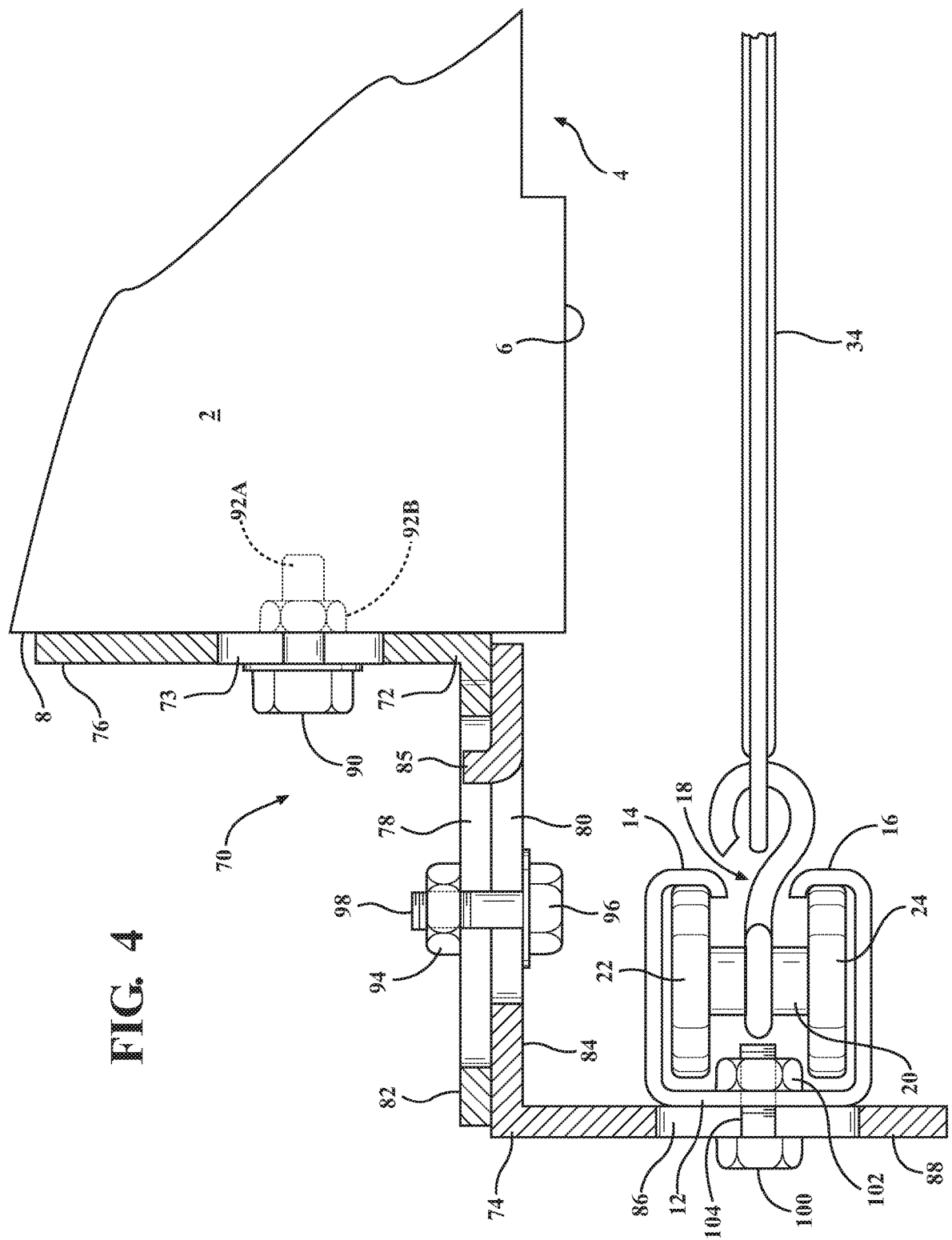
FIG. 4 is a partial overhead illustration similar to FIG. 1 of a mounting configuration according to a second embodiment in which the roller and hook supporting channel tracks are each secured, via a pair of overlapping and redesigned "L" shaped support brackets, to a relocated side face of the air intake structure in proximity to a central opening over which the supported filter or covering extends.
Figure 5:
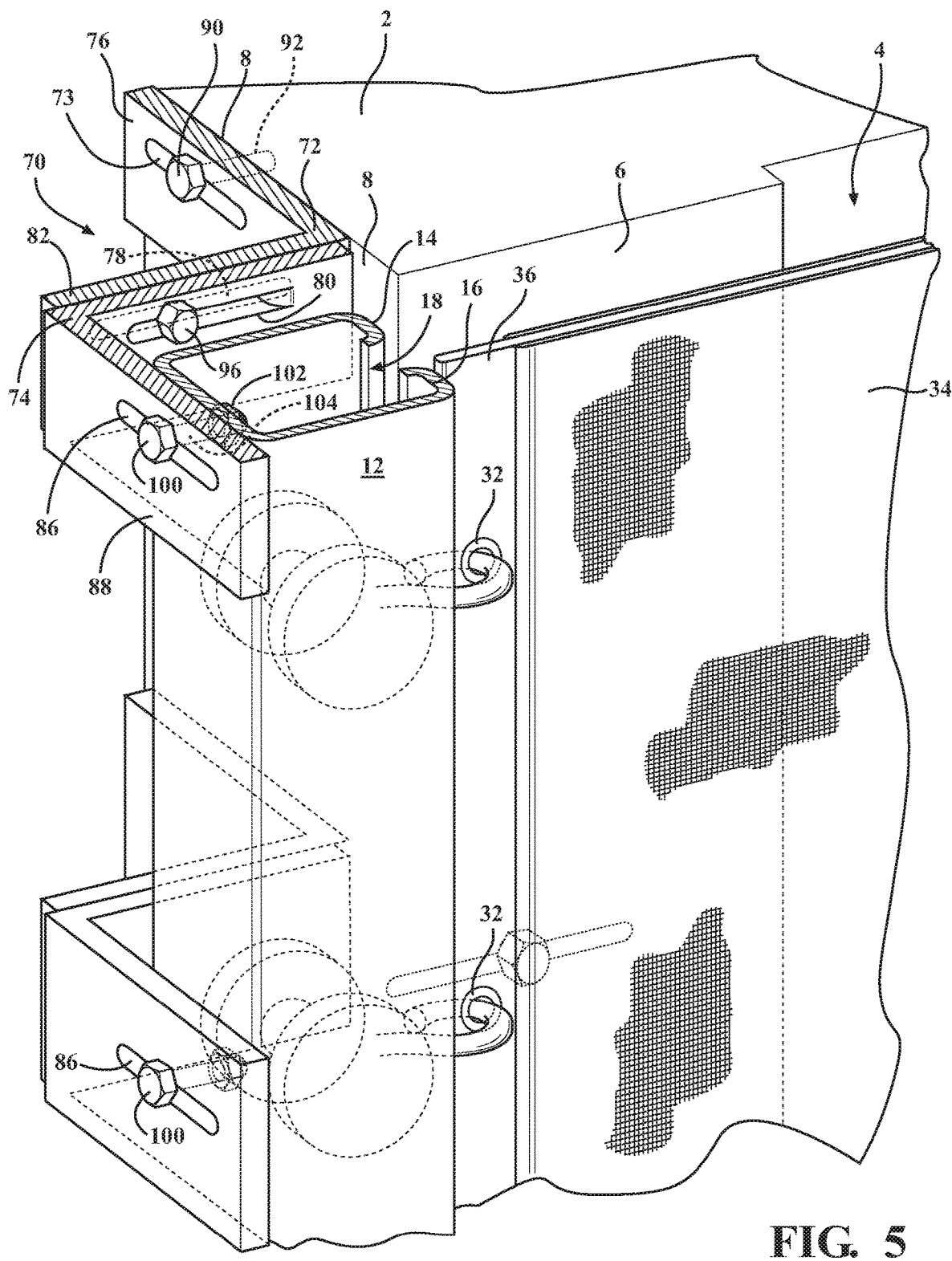
FIG. 5 is a perspective view of the variant of FIG. 4 and depicting vertically tiered pairs of overlapping "L" brackets for supporting a vertically extending channel track, each of the pairs of "L" support brackets further including a first adjustment slot configured through a first leg of a first brackets for adjusting in fore and aft directions relative to the intake face, a second adjustment slot configured through overlapping contact faces of the "L" brackets to positionally adjust the second "L" bracket laterally, and a third adjustment slot on a second extending leg of the outer secured bracket for adjusting the channel track in/out (fore and aft) from the front intake face parallel to the range of adjustment of the first slot.
Figure 6:
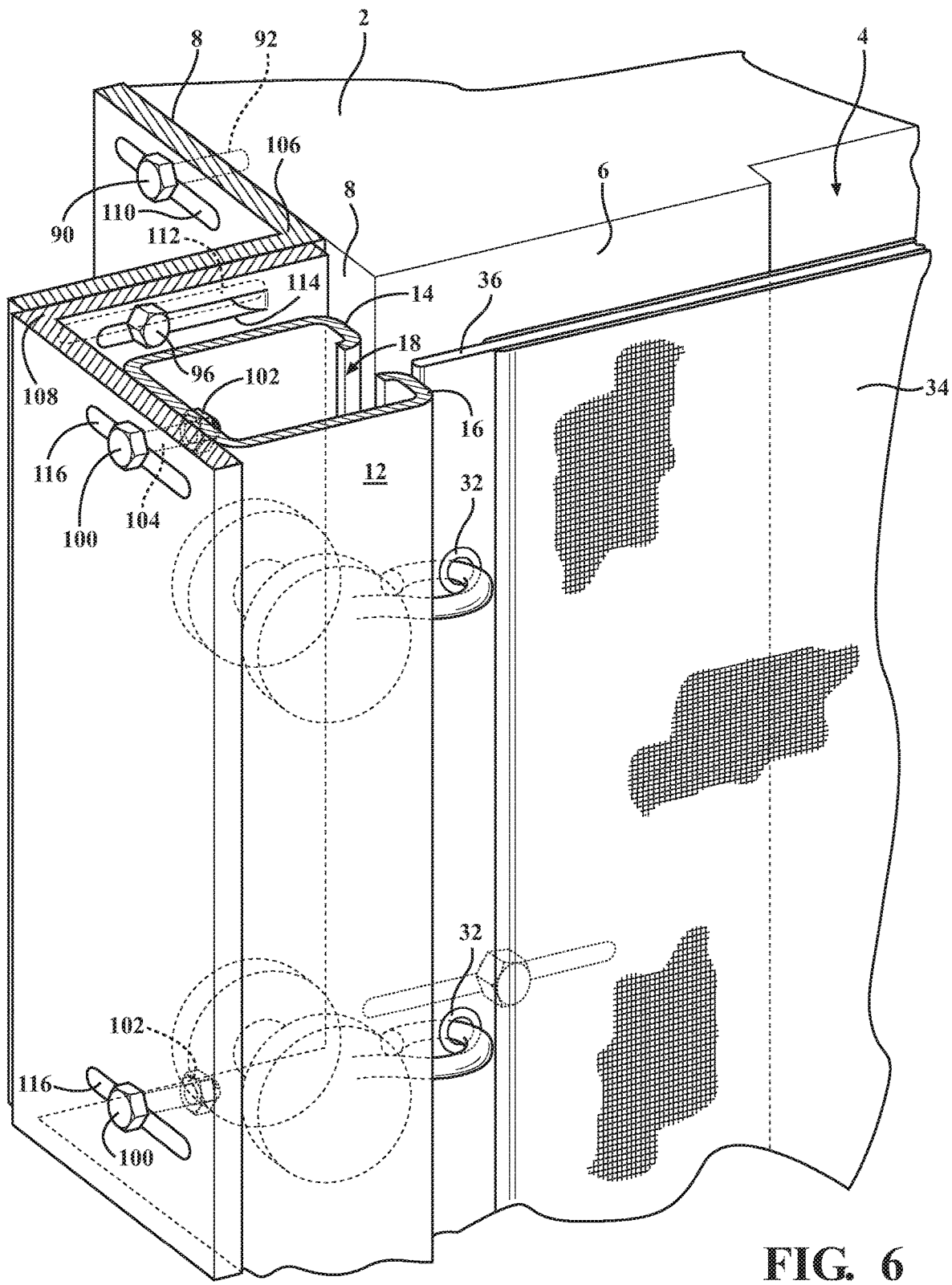
FIG. 6 is an illustration similar to FIG. 5 and depicting the provisional of a continuous and depth extending pair of elongate extending and "L" cross sectional shaped rails mounted to the forward intake face in substitution for the overlapping pairs of "L" shaped brackets.

With reference now to FIGS. 4-5, along with related FIG. 6, a series of additional embodiments are shown which expand upon the initial variants of FIGS. 1-2 and related FIG. 3. In each of FIGS. 4-6, the plural spaced brackets (FIGS. 1-2) or single cross sectional profiled and vertically extending rail in FIG. 3 which is secured to the front face 6 of the air intake structure, is instead replaced by cross section-ally depicted pairs of partially overlapping brackets which adapt to engage the proximate and outward directed side face 8 of the intake structure 2, this permitting dual adjustment of the brackets in the in/out (or "z") direction (as identified in FIG. 2), along with a further overlapping and lateral ("x") direction range of adjustment.

Referencing FIG. 4, a partial overhead illustration is depicted at similar to FIG. 1 of a mounting configuration according to a second embodiment, generally at 70, in which the roller and hook supporting channel tracks are each secured, via a pair of overlapping and redesigned "L" shaped support brackets 72 and 74, to a relocated and outward side face, again at 8 of the air intake structure 2, and again in proximity to the central opening 4 over which the supported filter or covering, again at 34, extends.

FIG. 5 is a perspective view of the variant of FIG. 4 and depicting vertically tiered pairs of the overlapping "L" brackets (similar to the plural arrangement of the brackets depicted in FIG. 2 for supporting the vertically extending channel track 12. Each of the pairs of redesigned "L" support brackets further includes a first adjustment slot 73 configured through a first leg 76 of the first bracket 72 for adjusting in fore and aft directions ("y" axis) relative to the intake face 8.

A second adjustment slot is configured through overlapping contact faces of the "L" brackets 72/74 (see overlapping slots 78/80 associated with overlapping leg 82 of the first bracket 72 and overlapping leg 84 of the second bracket 74), this again as best shown in FIG. 4 to positionally adjust the second "L" bracket 74 laterally ("x" axis). As is also best depicted in FIG. 4, a selected inner slot defining edge 85 of the leg 84 can be inwardly turned or angled as shown to seat within the overlapping slot 78 in the leg 82 of the first bracket 72 and provide better stability upon tightening of the associated mounting hardware. As specifically shown in FIG. 4, a second threaded bolt and nut arrangement is depicted by bolt 90 extending through the first adjustment slot 73, the bolt including an extending shaft 92A, to which is secured a nut 92B.

Finally, a third adjustment slot 86 is configured through a second extending leg 88 of the outer secured bracket 74 for adjusting the channel track in/out (fore and aft), again "z" axis) from the front intake face, and parallel to the range of adjustment of the first slot 73 (this again secured against the side face 8 of the intake structure 2) as depicted in each of FIGS. 4 and 5. A similar arrangement of bolt and fastener hardware (as compared to that shown in FIGS. 1-3) is provided for securing through each of the first 73, second overlapping 78/80 and third 86 slots configured between the overlapping pairs of "L" brackets 72/74.

The fasteners again include a bolt with enlarged head 90 and threaded stem 92A and engaging bold 92B for engaging within a location of the air intake side face 8 and for seating within the first slot 73 (as again depicted in FIGS. 4-5). It is also envisioned that any two headed fastener arrangement, again depicted by opposing nuts 94/96, can engaged to opposite ends of an inter extending threaded shaft 98 which secures through the overlapping pair of second slots 78/80 and a further bolt and nut fastener, including enlarged heads 100/102 with inter-extending threaded shaft 104, secures a base wall of the channel lock (or track) depicted again at 12 and via an aperture in the base wall which seats the threaded shaft 104 to allow attachment of the enlarged bolt head 100. As with the perspective illustration of FIG. 2 illustrating the individual "L" brackets 38, the pairs 72/74 of overlapping brackets can be provided in any vertically spaced plurality of securing channel lock or track 12 in multi-axial adjustable fashion both laterally ("x" axis) or depthwise ("z" axis) and to do so with a minimum of fabrication and required fasteners as compared to other installation assemblies.

FIG. 6 is an illustration similar to FIG. 5 and depicting the provisional of a continuous pair of elongate extending and "L" cross sectional shaped rails, at 106/108 mounted to the forward intake face in substitution for the overlapping pairs of "L" shaped brackets. A similar arrangement of first, second overlapping and third slots are further provided in the vertically extending and "L" cross sectional shaped rails 106/108 and include each of first slot 110 (compare to at 73 in FIG. 5), second overlapping slots 112/114 (compare to at 78/80) and third slot 116 (compare to at 86 in FIG. 5). The same mounting hardware as shown in FIGS. 4-5 (and identically numbered) can also be utilized.

Figure 7:
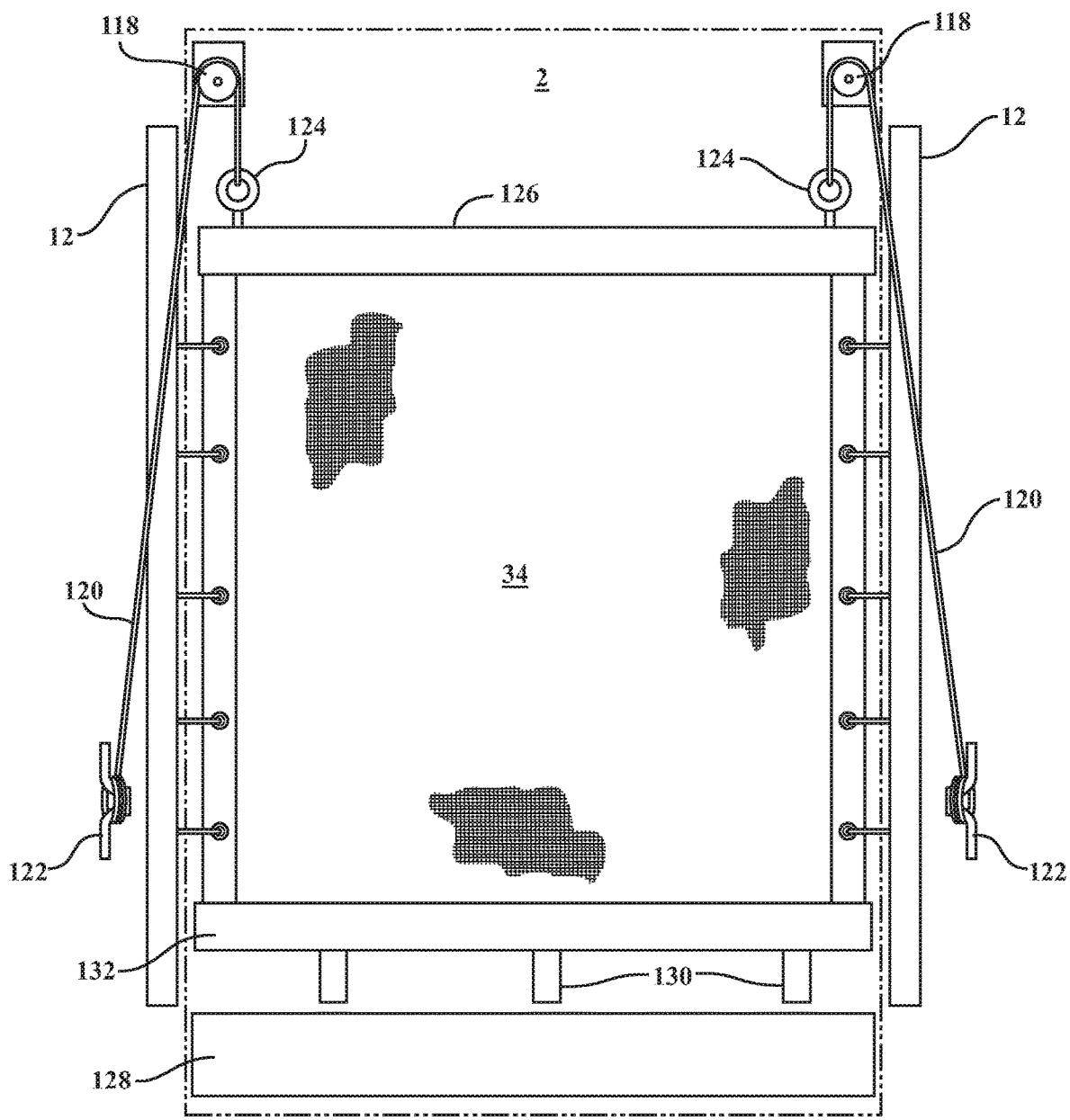
FIG. 7 is a plan view illustration of a non-limiting example of a filter assembly according to any of FIGS. 1-6 which is secured by a bracket and pulley mount arrangement to the air intake structure.
Figure 7A:
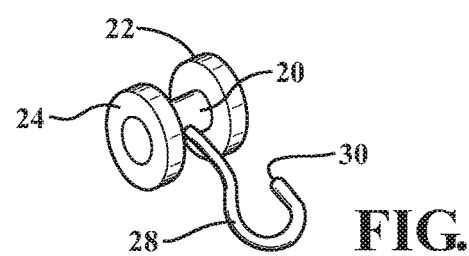
FIG. 7A further providing an illustration of a selected roller component including a common hub which rotatably supports a pair of wheels.

Finally, FIG. 7 is an elevation view illustration of a non-limiting example of a filter assembly according to any of FIGS. 1-6, and which is secured by a bracket and pulley mount arrangement, see locations 118, to the air intake structure 2 and such as above the intake opening 4 which is situated behind the filter or other covering 34. A line 120 can be utilized for passing through each of the upper side end located pulleys 118 and between a user accessible cleat 122 and a top edge engagement location of the filter/covering 34, such further depicted in non-limited fashion as including any number of eye bolts 124 which can attach through an upper extending sleeve supporting an internally positioned conduit pipe, see at 126.

Other features can include providing a separate vinyl cover 128 as a secondary component that wraps around the filter 34 when in a lowered and stored position. Alternative to a vinyl cover, bundle strips 130 can be sewn into the bottom of the filter and which can wrap around the filter when in the lowered and stored position, such as via a bottom edge extending sleeve with inserted inner supporting conduit 132 (from which the bundle strips 130 extend), to assist in securing when not in use.

It is also understood that a motorized device can be utilized for traversing the filter up/down across the intake opening, such as in combination with the pulley structure or using other traversing structures/linkages. Advantages of the present design include eliminating the use of integrated storage units, as well as cables, springs, I-bolts, J-bolts, and cable clamps typical of prior art filter mount assemblies, and in order to provide for less drilling of the intake face with reduced installation time.

Having described my invention, other and additional preferred embodiments will become apparent to those skilled in the art to which it pertains, and without deviating from the scope of the appended claims.

I claim:

1. A mounting assembly for use with a structure having front and interconnecting side faces surrounding an air intake opening, said assembly supporting a covering over the intake opening and comprising:
    at least one "L" shaped member having first and second angularly extending sides, a first of said sides adapted to be secured to either of the front or side faces of the structure on either side of the intake opening;
    a track secured to said second angularly extending side of each of said "L" shaped members so that said track is spaced from the front face of the intake structure on opposite sides and an interior accessible channel of each track is arrayed facing inwardly;
    a plurality of rollers contained within each of said tracks, said rollers each further including a forward extending hook portion projection from said interior track channels; and
    the covering having a plurality of side edge proximate located eyelets, said hook portions engaging through said eyelets for supporting the covering over the opening.

2. The assembly as described in claim 1, said at least one "L" shaped member further comprising a plurality of "L" shaped members vertically spaced along opposite sides of the intake structure.

3. The assembly as described in claim 1, said at least one "L" shaped member further comprising an elongated rail.

4. The assembly as described in claim 1, said at least one "L" shaped member further comprising pairs of overlapping "L" shaped brackets adapted to secure to the sides of the intake unit.

5. The assembly as described in claim 1, further comprising slots configured into each of said first and second sides of each of said "L" shaped member, fasteners mounting through said slots for securing said "L" shaped members at said first sides to the intake structure and at said second sides to said tracks for bi-axially adjusting said tracks relative to the intake structure.

6. The assembly as described in claim 1, the covering further comprising reinforced side edging integrating said eyelets.

7. The assembly as described in claim 1, further comprising pulleys mounted to the structure above the intake opening, a rope extending through said pulleys from a user accessible location and engaging upper edge locations of the covering.

8. The assembly as described in claim 7, further comprising sleeves configured into top and bottom extending edges of the covering and receiving a reinforcing conduit.

9. The assembly as described in claim 8, further comprising eye-bolts attached to said top edge extending conduit, or, related top edge fastening points for attachment of said to the top edge of the filter/covering.

10. The assembly as described in claim 8, further comprising bundle straps extending from said bottom edge extending conduit.

11. The assembly as described in claim 1, the covering further comprising a vinyl cover.

12. A mounting assembly for use with a structure having front and interconnecting side faces surrounding an air intake opening, said assembly comprising:
    an angled bracket having first and second angularly extending sides, a first of said sides adapted to secure to either of the front or side faces of the structure on either side of the intake opening;
    a track secured to said second angularly extending side of each of said angled brackets in a vertically extending direction so that said track is spaced from the front face of the intake structure on opposite sides and so that an interior accessible channel of each track is arrayed facing inwardly;
    a plurality of rollers contained within each of said tracks, said rollers each further including an extending portion projection from an interior track channels; and
    a covering engaged by said forward extending portions and adapted to being supported over the intake opening.

13. The assembly as described in claim 12, said angled bracket further comprising at least one "L" shaped member vertically spaced along opposite sides of the intake structure.

14. The assembly as described in claim 13, said at least one "L" shaped member further comprising pairs of overlapping "L" shaped brackets adapted to secure to the sides of the intake unit.

15. The assembly as described in claim 12, further comprising slots configured into each of first and second sides of each of said angled brackets, fasteners mounting through said slots for securing said brackets at first ends to the intake structure and at second ends to said tracks for bi-axially adjusting said tracks relative to the intake structure.

16. The assembly as described in claim 12, the covering further comprising reinforced side edging integrating a plurality of eyelets for receiving said extending portions of said rollers.

17. The assembly as described in claim 12, further comprising pulleys mounted to the structure above the intake opening, a line extending through said pulleys from a user accessible location and engaging upper edge locations of the covering.

18. The assembly as described in claim 17, further comprising sleeves configured into top and bottom extending edges of the covering and receiving a reinforcing conduit.

19. The assembly as described in claim 18, further comprising eye-bolts attached to said top edge extending conduit, or, related top edge fastening points for attachment of said lines to the top edge of the covering.

20. A mounting assembly for applying and adjusting covering over an air intake opening of a structure, the structure having front and interconnecting side faces surrounding the air intake opening, said assembly comprising:

brackets having first and second angularly extending sides, a first of said sides adapted to secure to either of the front or side faces of the structure on either side of the intake opening;

a vertically extending channel track secured to each of said brackets so that said track is forwardly spaced from the front face of the intake structure and so that an interior accessible channel of each track is arrayed in opposing fashion on opposite sides of the front intake face;

said brackets further including at least first and second individual pairs of said brackets which are adjustably inter-attached along fasteners and slots configured at overlapping angled sides to permit multi-dimensional adjustability of the vertical channel tracks relative to the intake face opening;

a plurality of rollers contained within each of said tracks, said rollers each further including an extending portion projection from an interior track channels;

a covering engaged by said forward extending portions and adapted to being supported over the intake opening; and at least one pulley mounted to the structure above the intake opening, a line extending through said pulley from a user accessible location and engaging an upper edge locations of the covering.

\* \* \* \* \*